UNITED STATES PATENT OFFICE.

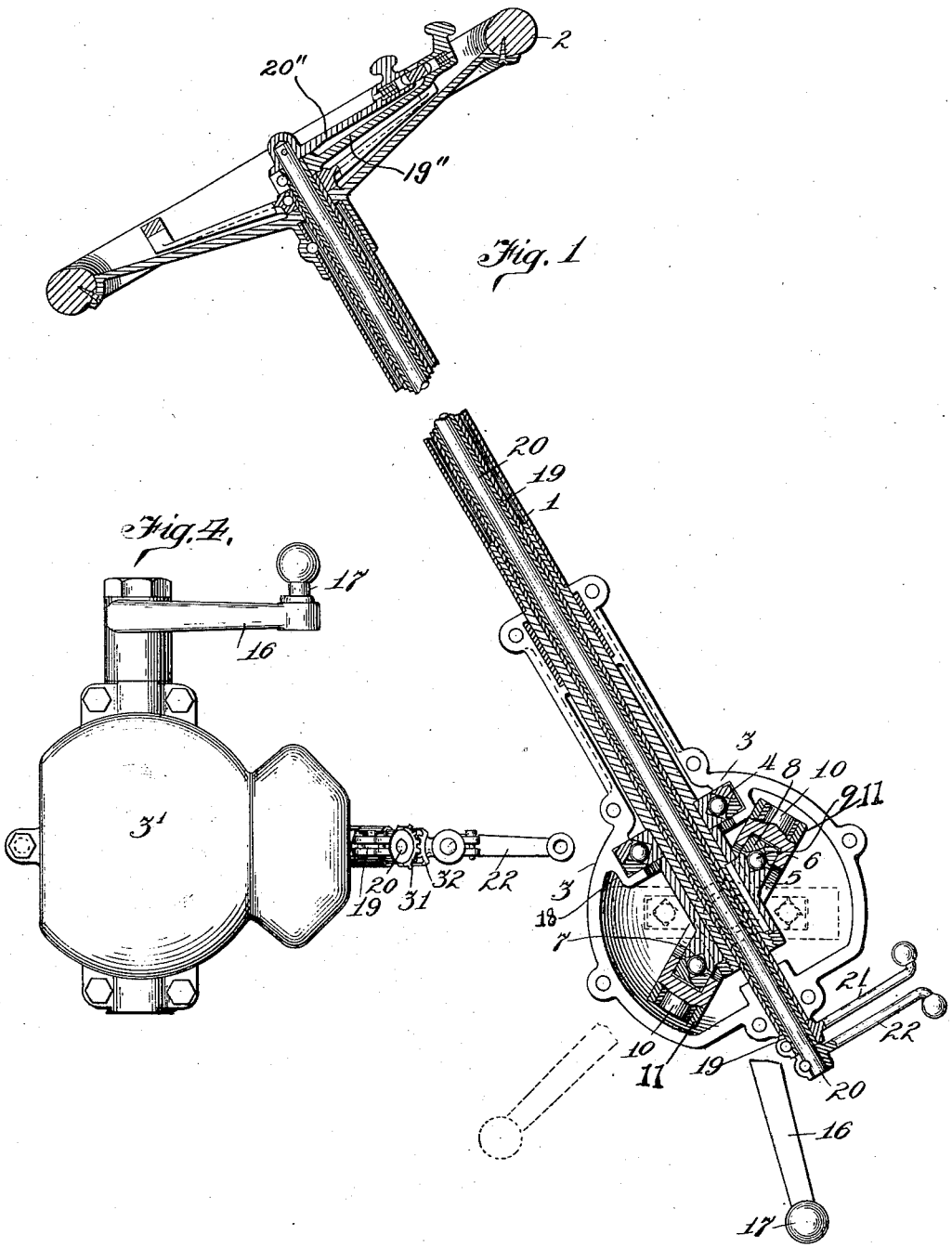

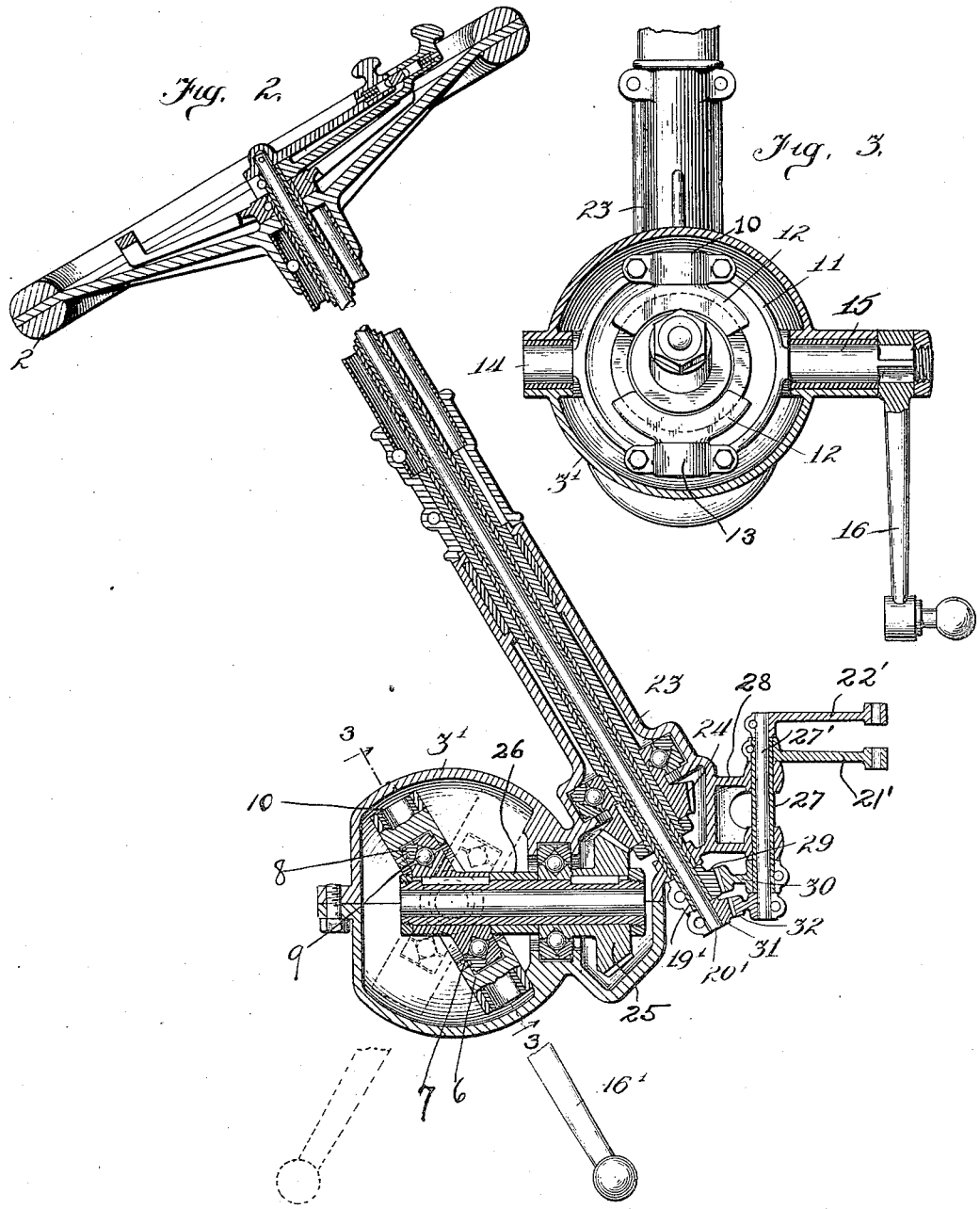

MARTIN L. WILLIAMS, OF SOUTH BEND, INDIANA.

STEERING MECHANISM.

1,026,728. Specification of Letters Patent. Patented May 21, 1912.

Application filed March 9, 1908. Serial No. 420,012.

*To all whom it may concern:*

Be it known that I, MARTIN L. WILLIAMS, a citizen of the United States, residing at the city of South Bend, in the county of St.
Joseph and State of Indiana, have invented certain new and useful Improvements in Steering Mechanisms, of which the following is a specification.

This invention relates to improvements in steering mechanisms and refers more particularly to an improved steering mechanism for motor vehicles, but which, however, may be used in vessels and the like without material change in construction.

Among the salient objects of the invention are, to provide a construction in which, by the simple expedient of mounting a universal or gimbal joint mechanism directly upon the periphery of a ball-race ring, which is in turn fixed upon a rotatable shaft, concentrically with, but inclined to, an axis of the shaft, a direct and powerful rocking movement of an actuating crank may be secured by the expenditure of a minimum amount of manual force, while, at the same time, the driving engagement of parts with each other will be both of extended area and of such character as to minimize wear-play and lost motion; to provide a construction in which anti-friction devices may be and are interposed between those parts which perform the greatest travel upon each other, and these devices are so arranged that there is a complete circumferential series of contacts at all times, as distinguished from contacts at one or two points only thereby enabling the set of balls and races to successfully withstand the pounding back-thrust of the controlled wheel; to so arrange the anti-friction devices that notwithstanding the minimizing of friction, any manual force required to hold the steering head immovably against back-thrust or back-lash will be slight; to provide a construction in which the within working parts are fully incased and still may, if desired, be made to operate submerged in oil; to provide a construction which lends itself to ready adaptation to various machines and positions; and, in general, to provide an extremely durable and efficient mechanism of the character referred to.

The invention consists in the matters hereinafter described and more particularly pointed out in the appended claims.

The invention will be understood from the following description, reference being had to the accompanying drawings in which—
Figure 1 is an axially sectional view of the steering head, in one of its simplest forms; Fig. 2 is a similar view of a modification in which the actuating crank is offset relatively to the steering head crank and driven by gear connections from the latter; Fig. 3 is a sectional detail taken on line 3—3 of Fig. 2, and looking in the direction of the arrows; Fig. 4 is an outside view of the part shown in Fig. 2 viewed from below.

In the drawings, 1 designates the steering staff which is tubular and is rigidly attached at the upper end to the hand-wheel 2. The staff extends into a bottle-shaped casing 3, inside of which is arranged a set of balls 4 in which the staff is journaled.

On the staff, inside the casing is rigidly fixed a ring or disk 5 inclined relatively to the staff but concentrically mounted thereon. To coöperate with this disk, a member 6 is journaled to its periphery, but held against rotation with the disk, from which it follows that said member must have a true gyratory movement and is hence hereafter referred to as the gyratory member.

The preferred construction is as follows: In the disk is formed a V-shaped ball-race 7 surrounded by a similarly grooved circumferentially split race-ring 8 forming a part of the member 6, with a set of balls 9 interposed. The coöperative members are thus anti-frictionally connected and the inner ring 8 of the gyratory member positively gyrated. The member 6 is provided at diametrically opposite points with radial trunnions or stub shafts (see Fig. 3) 10, 10, which are journaled in suitable journal openings in an outer yoke ring 11. Said trunnions are, for convenience of construction, formed on segments 12, grooved at the inner sides to receive the ring and detachably but fixedly mounted on the latter. The journal openings and the outer ring have removable caps 13 to admit the trunnions 10. The yoke ring 11, is also provided with diametrically opposite radial trunnions or stub shafts 14, 15, which engage journal openings in the outer casing; the axes of the trunnions 14, 15 being at right angles to that of the trunnions 10 and intersecting the axis of the shaft 1. On the end of the shaft 15 is rigidly mounted the crank 16 which actuates the steering knuckles, being to this end provided with a suitable wrist 17 to which the connecting rod is attached.

To prevent the hand-wheel from being turned a complete revolution (which may lead to mistakes in steering) stops are provided; these stops being conveniently formed by the opposite edges 18 of that part of the interior of the casing which incloses the ball bearings 4. The gyratory member encounters one or the other of these stops at the limit of its oscillation in each direction.

The staff 1 is provided with the usual internal staffs or shafts 19 and 20 inclosed one within the other, and respectively terminating in cranks 21 and 22, adapted for connection with the sparking and carbureter mechanisms respectively. Said shafts are provided with the usual controlling levers 19″ and 20″ respectively.

In operation, rotation of the hand-wheel 2 rotates the staff 1 and with it the inclined disk or race-ring 5. The gyratory member journaled thereon is thus positively oscillated and so imparts a positive oscillation to the crank arm 16.

In Figs. 2, 3 and 4 the construction is modified to the extent necessary to locate the main actuating crank in rear of and in offset relation to the main staff and the sparker and carbureter cranks above the lower end of the steering staff. For this purpose, the casing 3′, which incloses a gyratory member is formed as an offset shaft supporting frame rigid with the main tubular casing 23, which incloses and supports the lower end portion of the main staff. On the lower end of said staff, inside the casing 23, is mounted a bevel gear 24 which meshes with a corresponding gear 25 keyed upon a short angle shaft 26 journaled in the casing 3′. Shaft 26 carries a disk or race-ring and gyratory member constructed in the same manner as the corresponding parts of the previously described construction and bearing the same relations to the axis of the shaft 26. The shaft 26 is in fact merely an extension of the main staff, set at an angle to the latter and geared to rotate therewith. Incidentally, gear 24 is made somewhat smaller than gear 25 so as to effect a speed reduction between the main staff and shaft 26, with a corresponding increase of leverage and larger movement at the handwheel. In a similar manner a pair of concentric shafts 27, 27′ are journaled in an upright position in an extension 28 of the casing frame 23, and operatively connected with the corresponding shafts 19′ and 20′ by intermeshing pairs of segments 29 and 30, and 31 and 32. The shafts 27, 27′ carry cranks 21′, 22′, corresponding to the cranks 20 and 21 of the first construction. The operation of this mechanism is, of course, precisely similar to that of the construction first described.

It will be understood that the several objects of the invention are fully attained in the constructions described. In both modifications the power is transmitted to the gyratory member through bearings, preferably anti-friction, so arranged that they at all times have complete circumferential engagement with each other and hence will not wear rapidly or disintegrate the race-ways under the back-lash or pounding wear. The fact that the plane of oscillation of the gyratory member is very nearly at right angles to the plane of the actuating disk obviously enables a very slight restraining force applied to the handwheel to hold the steering train absolutely immovable in spite of the fact that the parts have anti-friction bearings substantially throughout. The diameter of the periphery of the actuating disk is large and the trunnions or axes of the gyratory member are supported at widely separated points, from which it follows that lost motion is reduced to the minimum. The casing and the manner in which the several moving parts are journaled therein permit the main operative parts to be submerged in oil if so desired.

Other modifications may be made without departing from the invention.

I claim as my invention:

1. In a steering mechanism for automobiles, the combination with a main shaft, of an annular bearing member mounted thereon in a plane oblique to a plane at right angles to the shaft and having a ball race, a bearing ring provided with a ball race upon its inner periphery and extending exteriorly around said bearing member, a set of balls interposed between said races and extending around the same, trunnions carried by the outer periphery of the bearing ring, a yoke ring provided with journal bearings in which said trunnions are seated, stub shafts extending at right angles to said trunnions and carried by said yoke ring, a relatively fixed member in which said stub shafts are seated, a crank rigidly connected to one of the stub shafts, and leverage mechanism for actuating said main shaft.

2. In a steering mechanism for automobiles, the combination with a shaft, of an annular bearing member thereon mounted in a plane oblique to a plane at right angles to the shaft, a continuous bearing ring extending around said bearing member, opposed segments fitting over the periphery of said ring and secured thereto, trunnions carried by said segments, a yoke member extending around said ring and having journal bearings in which the said trunnions are seated, stub shafts on said yoke member extending at right angles to said trunnions, a casing inclosing said parts and provided with bearings for said shafts, one of said shafts extending through the side of the casing, and an operating member connected to said latter shaft.

3. In a steering mechanism for automobiles, the combination with a shaft, of an annular bearing member thereon mounted in a plane oblique to a plane at right angles to the shaft, a continuous bearing ring extending around said bearing member, trunnions carried by the periphery of said ring, a yoke member extending around said ring and having bearings for the trunnions, said bearings having removable caps to admit the trunnions, stub shafts carried by said yoke member, a casing inclosing said parts and provided with bearings for said shafts, one of said shafts extending through the sides of the casing, and an operating member connected to said shaft.

4. In a steering mechanism for automobiles, the combination with a shaft, of an annular bearing member mounted thereon in a plane oblique to a plane at right angles to the shaft, a continuous bearing ring extending around said annular bearing member and operatively engaging the same throughout its circumference, trunnions carried by said bearing ring, a movable yoke member connected to said ring, stub shafts carried by said yoke, a closed casing inclosing said operative parts and having journal bearings for said stub shafts, and a part to be connected to one of said stub shafts.

MARTIN L. WILLIAMS.

Witnesses:
BERTHA ESHLEMAN,
J. R. AUSTIN.